United States Patent
Dunn et al.

(10) Patent No.: US 7,363,697 B1
(45) Date of Patent: Apr. 29, 2008

(54) METHOD FOR MANUFACTURING A GROUP OF HEAD GIMBAL ASSEMBLIES

(75) Inventors: Victor K. F. Dunn, San Jose, CA (US); Ciuter Chang, Fremont, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 354 days.

(21) Appl. No.: 11/060,895

(22) Filed: Feb. 18, 2005

(51) Int. Cl.
  *G11B 5/127* (2006.01)
  *G11B 5/55* (2006.01)

(52) U.S. Cl. ............... 29/603.03; 29/603.04; 29/603.06; 29/603.09; 29/737; 360/266.3

(58) Field of Classification Search ............ 29/603.04, 29/603.03, 603.09, 603.06, 737; 310/13; 360/265.9, 266.3, 246.2; 228/180.22, 179.1; 73/105, 104
See application file for complete search history.

(56) References Cited

U.S. PATENT DOCUMENTS

| | | | |
|---|---|---|---|
| 5,528,922 A | 6/1996 | Baumgart et al. | |
| 5,567,864 A | 10/1996 | Coon et al. | |
| 5,631,408 A * | 5/1997 | Baumgart et al. | ............ 73/1.81 |
| 5,758,406 A * | 6/1998 | Hunsaker et al. | ........ 29/603.06 |
| 6,092,412 A * | 7/2000 | Flechsig et al. | .............. 73/105 |
| 6,164,118 A | 12/2000 | Suzuki et al. | |
| 6,196,062 B1 * | 3/2001 | Wright et al. | .................. 73/105 |
| 6,275,029 B1 * | 8/2001 | Schaff | ........................ 324/212 |
| 6,299,947 B1 | 10/2001 | Suzuki et al. | |
| 6,362,452 B1 | 3/2002 | Suzuki et al. | |
| 6,408,677 B1 | 6/2002 | Suzuki | |
| 6,529,342 B1 | 3/2003 | Feng et al. | |
| 6,700,724 B2 | 3/2004 | Riddering et al. | |

* cited by examiner

*Primary Examiner*—A. Dexter Tugbang
*Assistant Examiner*—Tai van Nguyen
(74) *Attorney, Agent, or Firm*—Jonathan E. Prejean, Esq.; Kent A. Lembke, Esq.

(57) ABSTRACT

A system and method for the production level screening of low flying magnetic heads in the manufacture of disk drive head disk assemblies (HDAs) is disclosed. A test disk is provided and has a plurality of bumps extending from at least one surface thereof. The test disk is rotated to fly a head of a head gimbal assembly selected from the group adjacent the surface of the test disk. An interaction of the head with one or more of the plurality of bumps may be sensed and the head gimbal assembly may be screened out from the group in response to the sensing of the interaction.

11 Claims, 6 Drawing Sheets

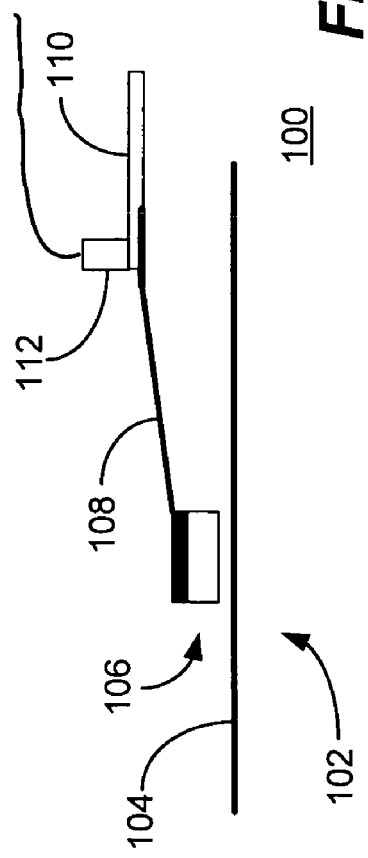
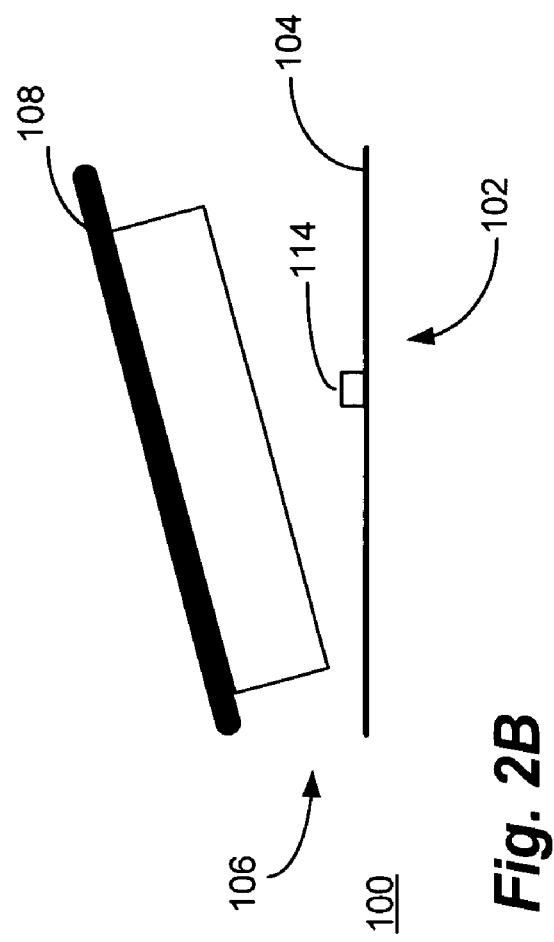

METHOD FOR MANUFACTURING A GROUP OF HEAD GIMBAL ASSEMBLIES

BACKGROUND OF THE INVENTION

The present invention relates, in general, to the field of rotating data storage media. More particularly, the present invention relates to a system and method for the production level screening of low flying magnetic heads in the manufacture of disk drive head disk assemblies (HDAs).

A partially cut-away, isometric illustration of a typical prior art disk drive HDA 10 is shown in FIG. 1. The HDA 10 includes a number of disks 12 which are rotated about a spindle 14 by means of a motor (not shown). An actuator motor 16 positions an arm 18 with respect to data tracks on the surfaces of the disks 12. The actuator arm, in turn, positions a suspension 20 and head 22 which flies adjacent to the rotating surfaces of the disks 12.

A disk drive read/write head generally comprises a read/write transducer and a slider that includes an air bearing surface (ABS). The ABS allows the slider to "fly" adjacent the surface of a rotating disk due to the development of an air bearing between the disk surface and the ABS. The slider is generally bonded to a thin metal arm, or suspension, that holds the head in position above or beneath the rotating disks. Typically, the combination of a head and suspension is called a head gimbal assembly (HGA) and multiple HGAs may be stacked together to form a head stack assembly (HSA). Functionally, the arms and heads of the HSA are positioned with respect to the respective disk surfaces during operation by means of an actuator or servo mechanism.

As mentioned previously, during normal operation, the read/write head is separated from the disk surface as it spins by a thin air bearing. The suspension serves to apply a force in a direction opposite to the pressure generated by the air bearing to maintain an equilibrium condition in which the transducer is separated from the disk surface by a small controlled spacing, to enable the reading and writing of data. If the desired equilibrium condition is disturbed, for example by excessive shock or vibration, or if the equilibrium condition is never established, for example due to component manufacturing variances, the head can crash into the disk surface. Not only can this damage the disk surface at that location, but debris from the crash site can cause further problems throughout the HDA.

As the areal density of disk drives increases, heads are required to fly lower and lower to the disk surface in order to read and write data. With current technology, this height can be below 0.5 micro-inches. In actual head production, there is often a variation in the fly heights of the heads in a given product due to process specific tolerances. Heretofore, most approaches have attempted to control and reduce the flying height variations (sigma) on a given lot, and from lot to lot. The variations may also be reduced by improved suspension design (e.g. low stiffness), the ABS design, and other manufacturing process controls that reduce fly height sensitivity to process specific tolerances.

To account for fly height variation, the ABS must be designed to fly slightly higher than would otherwise be desirable. The fly height resulting from an ABS design is typically determined by computer modeling and simulation based on the well-known Reynold's Equation. However such computer simulation results must be confirmed and calibrated by experimental testing of fly height.

In this regard, certain patents illustrating the current state of the art in making and using calibration disks to enable the testing of the flying heights of certain heads in a test environment include: U.S. Pat. No. 5,528,922 issued Jun. 25, 1996 for: "Method of Making Disk Bumps with Laser Pulses for Calibrating PZT Sliders"; U.S. Pat. No. 6,408,677 issued Jun. 25, 2002 for: "Calibration Disk Having Discrete Bands of Composite Roughness"; and U.S. Pat. No. 6,164,118 issued Dec. 26, 2000 for: "Calibration Disk Having Discrete Bands of Calibration Zones". It should be noted that the subject matter of these specific patents is directed to testing (e.g., glide head calibration) in a test environment and not a production level screening technique as disclosed herein.

SUMMARY OF THE INVENTION

Disclosed herein is a method for manufacturing a group of head gimbal assemblies. The method comprises the acts of providing a test disk having a plurality of bumps extending from at least one surface thereof, rotating the test disk to fly a head of a head gimbal assembly selected from the group adjacent the at least one surface of the test disk, sensing an interaction of the head with one or more of the plurality of bumps and screening out the head gimbal assembly selected from the group in response to the sensing of the interaction. Further provided herein is a system for implementing the aforedescribed method and a disk drive head disk assembly including at least one of a group of head gimbal assemblies screened by the method.

BRIEF DESCRIPTION OF THE DRAWINGS

The aforementioned and other features and objects of the present invention and the manner of attaining them will become more apparent and the invention itself will be best understood by reference to the following description of exemplary embodiments taken in conjunction with the accompanying drawings, wherein:

FIG. 2A is a simplified representation of a disk drive read/write head slider assembly flying above the surface of a rotating disk as affixed to an associated suspension and test arm having, for example, an acoustic emission (AE) sensor associated therewith;

FIG. 2B is an enlarged view of a read/write head slider assembly as shown in the preceding figure illustrative of the head flying below the height of predetermined height laser bumps associated with a DET test disk media and which will generate an AE signal upon contact between the head and the bump;

DESCRIPTION OF EXEMPLARY EMBODIMENTS

Figure 1:
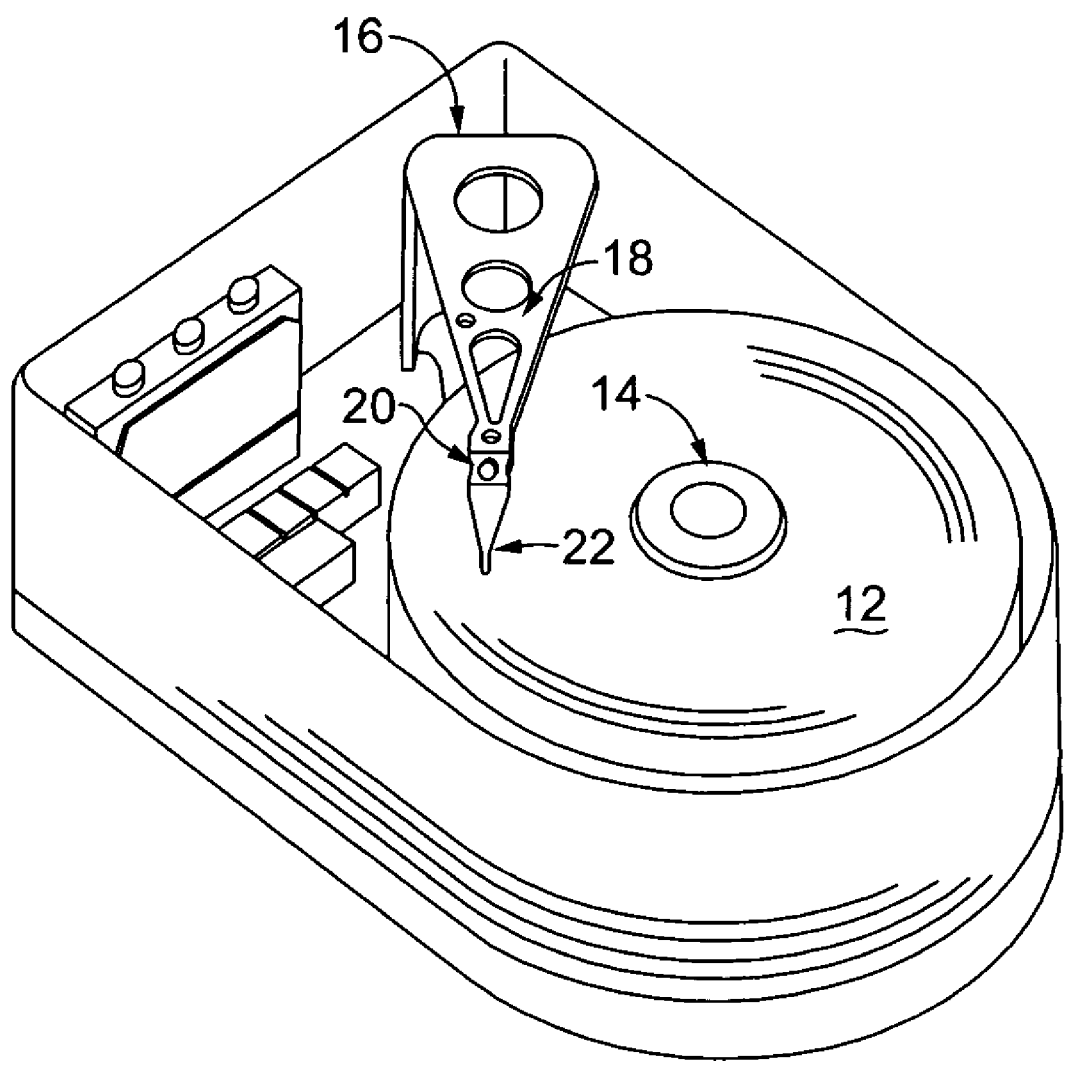
FIG. 1 is a isometric illustration of a partially cut-away, representative prior art disk drive head disk assembly (HDA)

An embodiment of the present invention, as disclosed herein, advantageously provides a production technique that serves to identify and remove the extreme low flying heads (e.g. the lower approximately 2.0%-5.0% of the distribution) utilizing, for example, acoustic emission (AE) sensors and laser bumps on test disks. Removal of the lower flying devices in the fly height distribution effectively serves to reduce the incidence of head/disk contact, and hence, to improve the overall reliability of the drives ultimately produced.

A system and method of an embodiment of the present invention further provides for production line monitoring of head fly height to enable the screening out of very low flying heads which may cause HDA reliability problems. The reliability of the resultant disk drives may be significantly improved by reducing the head/disk interface problems caused by low flying heads. Such problems may include, for example, lubricant degradation, read/write errors, debris generation and the like.

Implementation of a system and method of an embodiment of the present invention may be effectuated by the inclusion of, for example, an acoustic emission sensor and associated amplifier into existing industry test equipment and the provision of suitable media for dynamic electrical testing (DET) with added laser bumps at one or more of the inner diameter (ID), middle diameter (MD) and/or outer diameter (OD) of the disk. The result is a test environment which may be implemented in a manner compatible with existing glide height testing for disks.

With reference additionally now to FIG. 2A, a simplified representation of a system 100 comprising a disk drive read/write head slider assembly 106 flying above the surface 104 of a rotating disk 102 is shown. The read/write head slider assembly 106 is affixed to an associated suspension 108 and test arm 110 having, for example, an acoustic emission (AE) sensor 112 associated therewith.

In conventional applications for use with glide avalanche (GA) disks, a sensor is mounted on the glide on the glide head itself. As illustrated herein, the AE sensor 112 is mounted remotely from the head and may be mounted directly on the test arm adjoining the attachment of the suspension. In a particular implementation of the system and method of the present invention, low flyers may be detected in accordance with the technique disclosed herein using, inter alia, a contact start stop (CSS) tester such as the Olympus tester produced by the Center for Tribology, Inc. (CETR), Campbell, Calif.

With reference additionally now to FIG. 2B, an enlarged view of a read/write head slider assembly 106 as shown in the preceding figure is depicted illustrative of the head slider assembly 106 flying below the height of predetermined height laser bumps 114 formed on the surface 104 of a DET test disk 102 media. Like structure to that previously described with respect to FIG. 2A is like numbered and the foregoing description applies to this structure and/or these components. In operation, contact between the head slider assembly 106 and one or more of the bumps 114 will serve to generate an AE signal by means of sensor 112 (FIG. 2A) which can be monitored to enable screening of low flyers in accordance with a system and method of an embodiment of the present invention as disclosed herein.

Figure 3A:
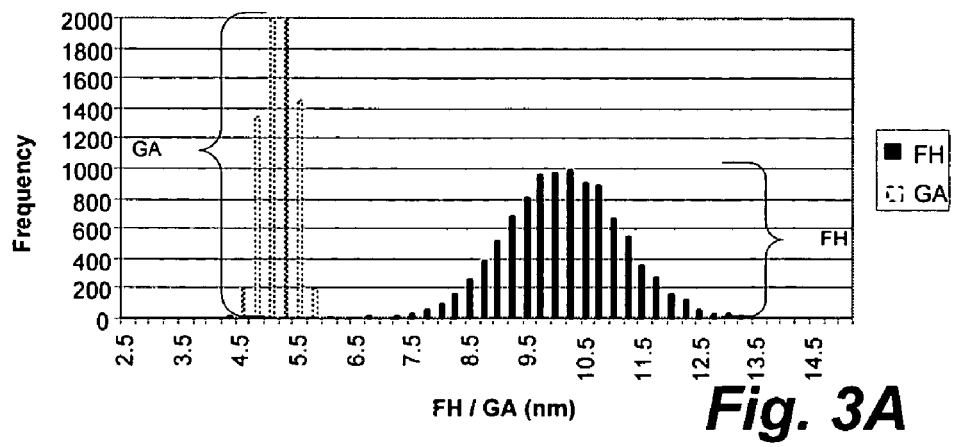
FIGS. 3A, 3B and 3C are graphical representations of exemplary fly height distributions at mean fly heights (FH) of substantially 10.0 nm (0.40 micro-inches), 8.0 nm (0.32 micro-inches) and 6.5 nm (0.23 micro-inches) respectively illustrating fly height and glide avalanche (GA) ranges at population frequencies of between 0.0 and 2000 wherein the low flying heads are seen to touch as the mean fly height is lowered.
Figure 3B:
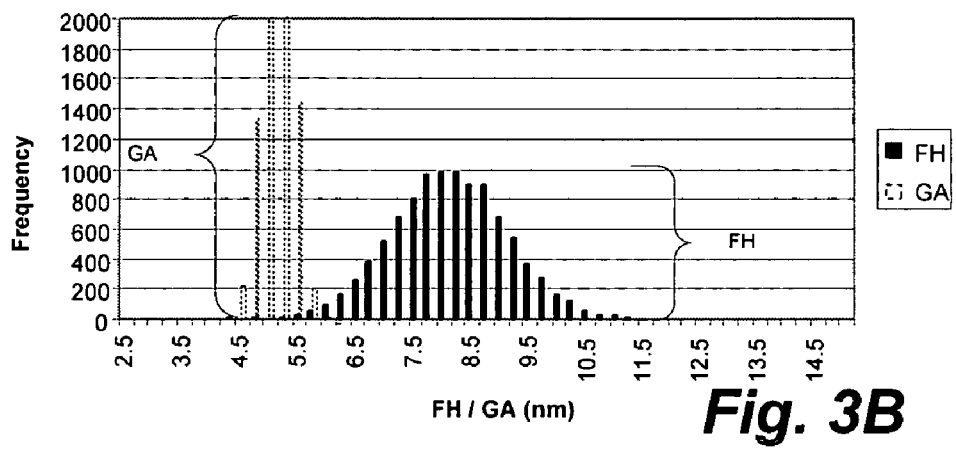
Figure 3C:
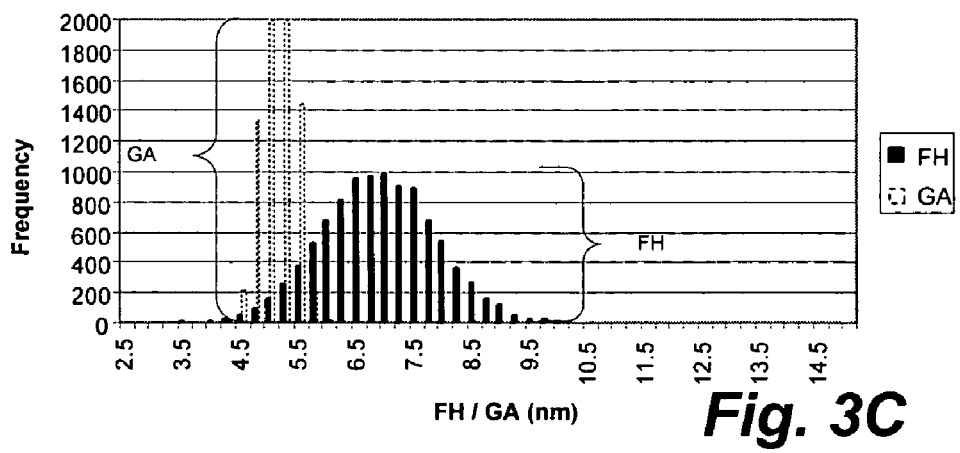

With reference additionally now to FIGS. 3A, 3B and 3C, graphical representations of exemplary fly height distributions at mean fly heights (FH) of substantially 10.0 nm (0.40 micro-inches; FIG. 3A), 8.0 nm (0.32 micro-inches; FIG. 3B) and 6.5 nm (0.23 micro-inches FIG. 3C) are shown. These figures illustrate fly height and glide avalanche (GA) ranges at population frequencies of between 0.0 and 2000 wherein the low flying heads are seen to touch as the mean fly height is lowered.

The range of mean fly height applicable to a specific embodiment of the present invention disclosed herein may be from 6.4 nm (0.25 micro-inches) to 12.7 nm (0.50 micro-inches). A possible cut-off range for low flyers would then be, for example, from mean fly height—1.5 sigma (6.7% of normal distribution) to mean fly height—3 sigma (0.13% of normal distribution). In accordance with the Case 2 scenario of FIG. 3B in particular, a mean fly height of 8.0 nm (0.32 micro-inches) is illustrated with a sigma of 1.0 nm. With a cut-off threshold for low flyers set at 8.0 nm—2 sigma, this equates to 6.0 nm (0.24 micro-inches). As such, this would remove approximately 2.3% of the population of heads (given a normal distribution) and improve the overall head/disk reliability.

Figure 4:
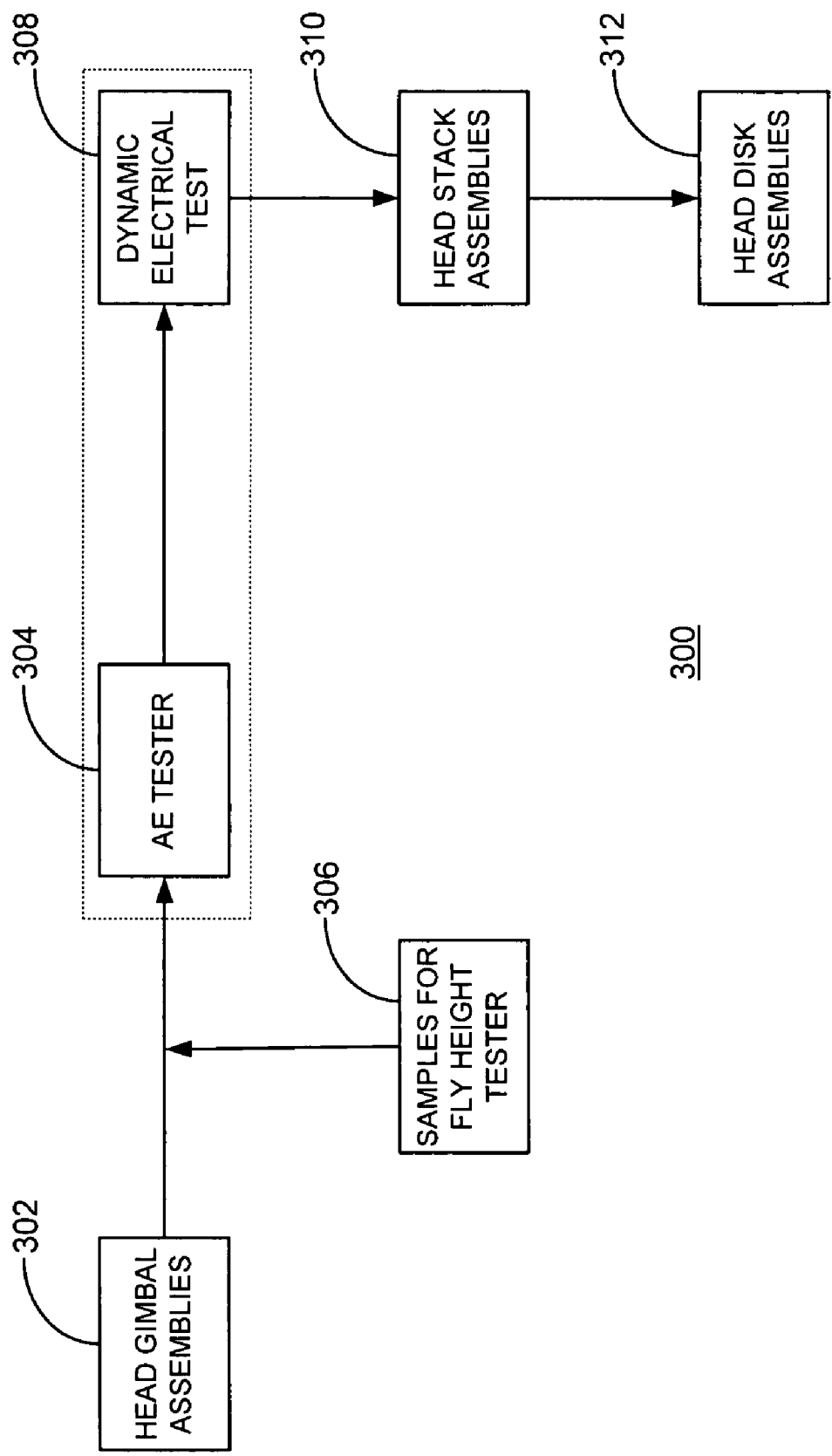
FIG. 4 is a simplified production flow chart in accordance with the present invention illustrating the use of an on-line AE tester to enable the screening of low flying heads prior to dynamic electrical test (DET)

With reference additionally now to FIG. 4, a simplified production process 300 flow chart in accordance with an embodiment of the present invention is shown illustrating the use of an on-line AE tester to enable the screening of low flying heads prior to dynamic electrical test (DET). The process 300 includes the introduction of head gimbal assemblies (HGAs) to the DET test stand at step 302, and introduction of bump disk samples to the DET test stand at step 306, for AE testing at step 304. The HGAs passing through the AE tester step 304 are then subjected to a DET test at step 308, following which they are further assembled into head stack assemblies (HSAs) at step 310 and then into head disk assemblies (HDAs) at step 312.

In other embodiments (not shown), the AE tester step 304 is performed after the head gimbal assemblies are assembled into head stack assemblies at 310 (i.e., the AE testing using the disk bumps may be performed upon one or more of the disks in a head stack rather than on each head gimbal assembly). In other words, a "group" of HGAs may be tested individually prior to assembly into an HSA or a "group" of HGAs may be assembled into an HAS and then, one or more of the HGAs in the HSA may be tested with an AE tester at step 304.

In the production of HGAs, the AE test step 304 and DET test step 308 may conveniently be combined (as indicated by the dashed-line box but it should be noted that the DET test step 308 is not required to practice the invention) and accomplished on the same DET test stand in accordance with the representative embodiment of the present invention shown, inter alia, to reduce overall cycle time. Further, the method may be implemented utilizing certain electrical testers available from Guzik Technical Enterprises, Mountain View, Calif., with an AE sensor (e.g. sensor 112 of FIG. 2A) to detect head/disk interactions.

Figure 5:
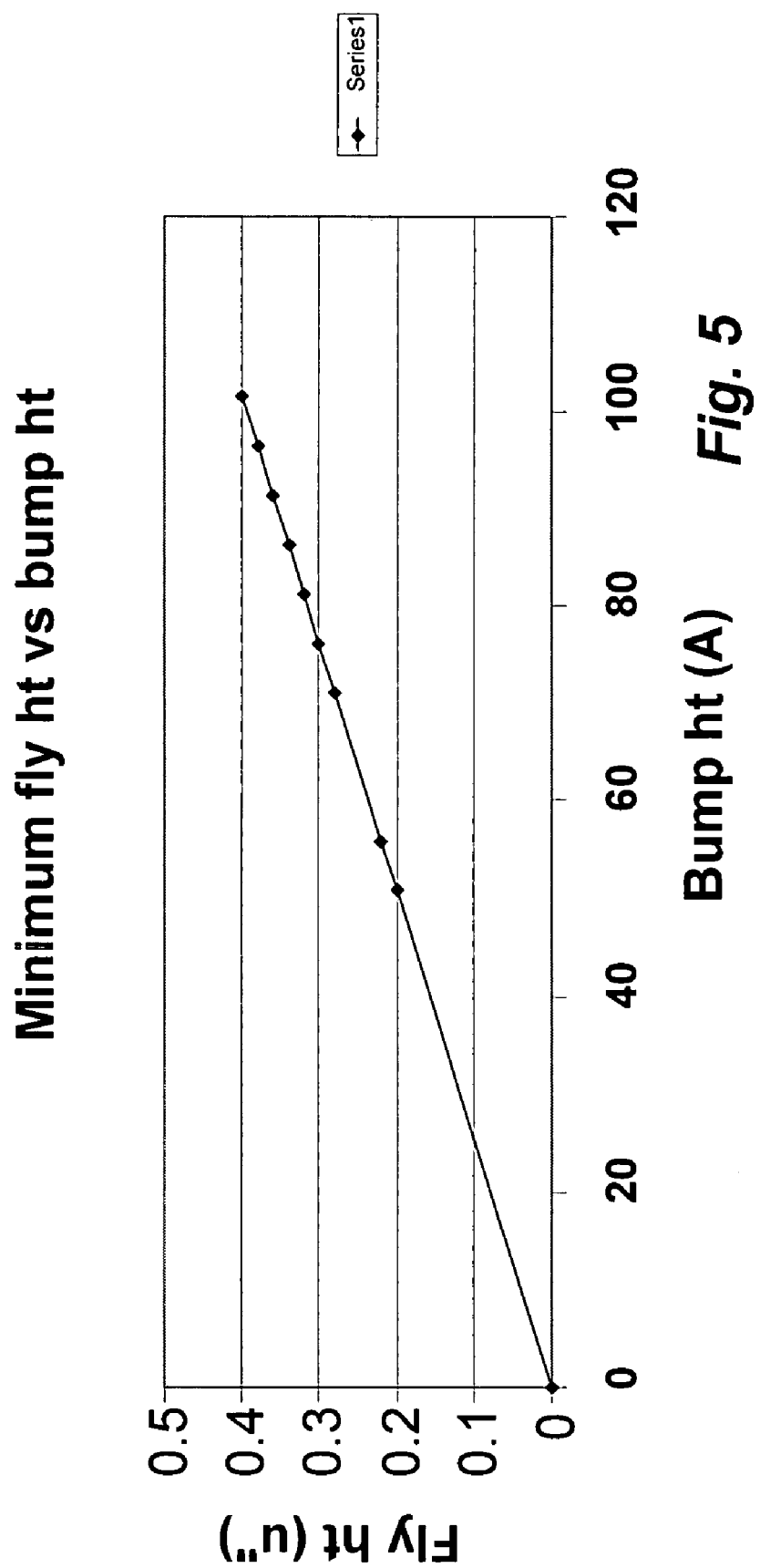
FIG. 5 is a graphical illustration of an exemplary minimum head fly height cut off (in micro inches) versus bump height (in Angstroms) assuming negligible air cushion effects in a representative implementation of the system and method of the present invention.

With reference additionally now to FIG. 5, a graphical illustration of an exemplary minimum head fly height cut off (in micro inches) versus bump height (in Angstroms) is shown in a representative implementation of the system and method of the present invention. In this example, the bumps are assumed to have negligible effect on fly height except at the location of each bump.

A disk incorporating specific bumps (whether formed by laser or otherwise) for use in screening low flyers may include bumps or other protrusions similar to the laser textured bumps on the disk landing zone. The height of the bumps, the bump density (i.e., the number of bumps on the disk surface per unit area), and/or their radial and circumferential spacing may be optimized for screening out low flyers. For example, assuming negligible bump effect on fly height as shown, the height of the bumps will be close to the actual flying height of sliders that fly just high enough to not be rejected (i.e. screened out) as flying too low. In an embodiment of the present invention this may correlate with the negative three sigma ($3\sigma$) threshold in a fly height distribution of a group of manufactured sliders built into HGAs. In the exemplary case of a 0.24 micro-inch flying height, the bump height would then be close to 6.0 nm or possibly higher. However, the AE signal strength depends on bump characteristics including bump height, bump density on the disk, bump height relative to fly height, and/or other bump characteristics. Higher bump density can be used and a bump height greater then 6.0 nm may be needed in order to compensate for the effect of the bumps on fly height as the heads will tend to fly higher than normal. The actual bump height is a matter of design choice and may be determined by the calibration of the tester with a range of heads with known fly heights and corresponding bump test disks with a range of bump heights.

Figure 6:
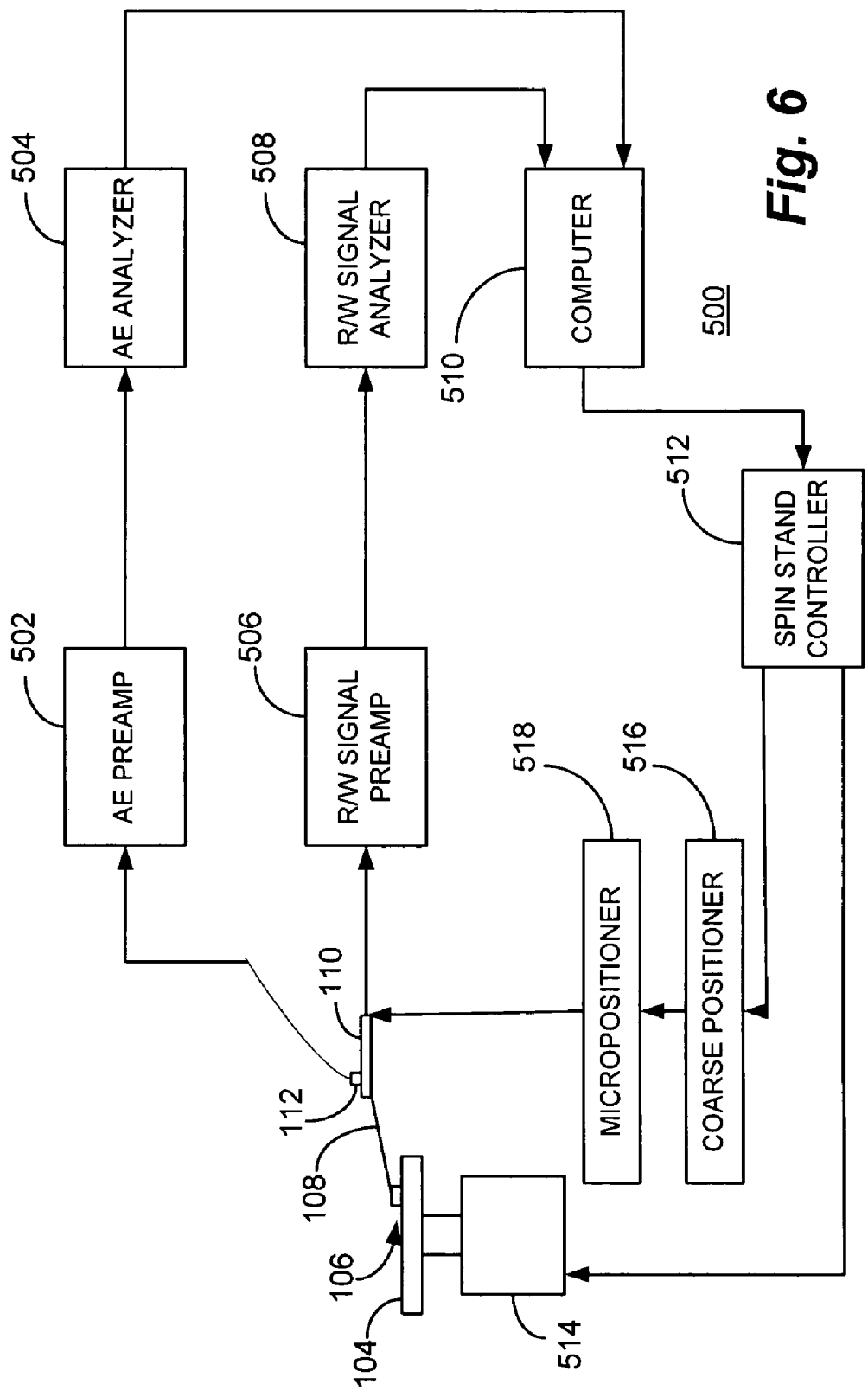
FIG. 6 is a functional block diagram of an integrated head tester system in accordance with the present invention illustrative of key components for DET measurements and screening of low flying heads utilizing, for example, AE signal detection.

With reference additionally now to FIG. 6, a functional block diagram of an integrated head tester system 500 in accordance with an embodiment of the present invention is shown which is illustrative of key components for DET measurements and screening of low flying heads utilizing, for example, AE signal detection. As previously described with respect to FIG. 2A, a read/write head slider assembly 106 may be affixed to an associated suspension 108 and test arm 110 having, for example, an acoustic emission (AE) sensor 112 associated therewith. The head slider assembly 106 flies over the surface 104 of test disks which are used to screen out low flyers. These disks have incorporated special laser bump heights at the inner diameter (ID), middle diameter (MD) and outer diameter (OD). These bumps may also conveniently be provided on DET test disks such that DET testing will immediately follow this test on the same disk as illustrated at step 308 in the process 300 of FIG. 4. Heads that fly below the minimum fly height specification will physically touch the bumps and cause a higher AE signal from the sensor 112. This would result in the rejection of the head before or concurrent with DET testing.

As shown, output from the sensor 112 may be applied through an AE preamplifier 502 to an AE analyzer 504. In addition, output from the read/write head itself may be supplied to a read/write (R/W) signal preamplifier 506 to a corresponding R/W signal analyzer 508. Output from the AE analyzer 504 and R/W signal analyzer 508 may be furnished to a computer 510 which operatively enables a spin stand controller 512. The spin stand controller 512 provides control signals to a spin stand 514, which serves to rotate the test disk in a controlled manner, and may also provide control signals to a course servo positioner 516 and a microposi- tioner 518 which control the positioning of the read/write head radially over the disk surface 104.

In operation, the laser bump height, diameter and spacing are optimized to produce a higher AE signal from the sensor 112 if the head flies below a certain minimum fly height (e.g. 0.25 micro-inches) as shown in the graph of FIG. 5. As may be required, a special batch of test heads may be made to check the AE sensitivity to fly height. In representative applications, the heads can fly in the range of 0.40 to 0.20 micro-inches. As an example, a head may be selected that flies at 0.25 micro-inches and a corresponding bump height and spacing can then also be selected that will result in a strong AE signal if it flies significantly below that height.

While there have been described above the principles of the present invention in conjunction with specific exemplary test equipment, methodologies and the like, it is to be clearly understood that the foregoing description is made only by way of example and not as a limitation to the scope of the invention. Particularly, it is recognized that the teachings of the foregoing disclosure will suggest other modifications to those persons skilled in the relevant art.

The invention claimed is:

1. A method for manufacturing a group of head gimbal assemblies, the method comprising the following acts:

providing a test disk having a plurality of bumps extending from at least one surface thereof;

forming at least a first portion of said plurality of bumps on said test disk to at least a predetermined height;

rotating said test disk to fly a head of a head gimbal assembly selected from the group adjacent said at least one surface of said test disk;

sensing an interaction of said head with one or more of said plurality of bumps; and screening out said head gimbal assembly selected from the group in response to said sensing of said interaction, wherein the act of sensing is accomplished temporally adjacent a dynamic electrical test of said head gimbal assembly selected from the group and wherein the predetermined height is between about 2 nm and about 12 nm.

2. The method of claim 1, wherein the act of sensing is accomplished at least partially concurrently with the dynamic electrical test of said head gimbal assembly selected from the group.

3. The method of claim 1, wherein the act of providing said test disk further comprises:

focusing a laser beam on said test disk at selected locations on said at least one surface to form said plurality of bumps.

4. The method of claim 1, wherein the head gimbal assembly selected from the group is arranged in a head stack assembly prior to the rotating of the test disk.

5. The method of claim 4, further comprising:

suspending the head gimbal assembly selected from the group adjacent to said at least one surface of said test disk.

6. The method of claim 5, wherein the act of sensing is accomplished substantially concurrently with the dynamic electrical test of the head gimbal assembly selected from the group.

7. The method of claim 1, wherein the act of rotating said test disk further comprises:

placing said test disk on a spinstand and controllably rotating the spin stand proximate to the head gimbal assembly selected from the group.

8. The method of claim 1, wherein the act of sensing an interaction of said head further comprises:

monitoring an acoustic emission of a sensor affixed to a test arm associated with the head gimbal assembly selected from the group.

9. A method for manufacturing a group of head gimbal assemblies the method comprising the following acts:

providing a test disk having a plurality of bumps extending from at least one surface thereof;

forming at least a first portion of said plurality of bumps on said test disk to at least a predetermined height;

rotating said test disk to fly a head of a head gimbal assembly selected from the group adjacent said at least one surface of said test disk;

sensing an interaction of said head with one or more of said plurality of bumps; and screening out said head gimbal assembly selected from the group in response to said sensing of said interaction, wherein the act of sensing is accomplished temporally adjacent a dynamic electrical test of said head gimbal assembly selected from the group and wherein the predetermined height is greater than a glide avalanche height that is characteristic of a lot of product disks to be used together with the group of head disk assemblies in later manufacture of a quantity of disk drives.

10. A method for manufacturing a group of head gimbal assemblies the method comprising the following acts:

providing a test disk having a plurality of bumps extending from at least one surface thereof;

forming at least a first portion of said plurality of bumps on said test disk to at least a predetermined height;

rotating said test disk to fly a head of a head gimbal assembly selected from the group adjacent said at least one surface of said test disk;

sensing an interaction of said head with one or more of said plurality of bumps; and screening out said head gimbal assembly selected from the group in response to said sensing of said interaction, wherein the act of sensing is accomplished temporally adjacent a dynamic electrical test of said head gimbal assembly selected from the group and wherein the predetermined height is less than about a 1.5 sigma lower design limit on a flying height that is characteristic of the group of head gimbal assemblies.

11. The method of claim 10, wherein the predetermined height is less than about a 3 sigma lower design limit on a flying height that is characteristic of the group of head gimbal assemblies.

* * * * *